United States Patent
Hayashi

(10) Patent No.: US 8,037,898 B2
(45) Date of Patent: Oct. 18, 2011

(54) RESERVOIR TANK FOR VEHICLE BRAKE SYSTEM

(75) Inventor: Mitsuharu Hayashi, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 785 days.

(21) Appl. No.: 11/177,287

(22) Filed: Jul. 11, 2005

(65) Prior Publication Data

US 2006/0016484 A1   Jan. 26, 2006

(30) Foreign Application Priority Data

Jul. 22, 2004   (JP) ................. 2004-214235

(51) Int. Cl.
*F16K 37/00* (2006.01)
*F16D 1/00* (2006.01)

(52) U.S. Cl. ......... 137/558; 137/571; 73/306; 200/84 C; 60/585

(58) Field of Classification Search ............ 137/558, 137/574, 576, 571; 60/585; 73/306; 200/84 C; 116/228, 227; 220/562–564; 303/85; *B60T 11/26*
See application file for complete search history.

(56) References Cited

U.S. PATENT DOCUMENTS

| | | | |
|---|---|---|---|
| 3,751,614 A * | 8/1973 | Jones | 200/84 C |
| 4,487,021 A * | 12/1984 | Arakawa et al. | 200/84 C |
| 4,500,761 A * | 2/1985 | Kubota et al. | 200/84 C |
| 4,514,980 A * | 5/1985 | Ishiwata | 60/534 |
| 4,833,441 A * | 5/1989 | Okada et al. | 200/84 C |
| 5,083,115 A * | 1/1992 | Kamiya | 73/319 |
| 5,957,545 A * | 9/1999 | Sawada et al. | 60/585 |
| 6,105,611 A | 8/2000 | Ando et al. | |

FOREIGN PATENT DOCUMENTS

| | | |
|---|---|---|
| JP | 02-085662 | 7/1990 |
| JP | 11-20660 | 1/1999 |
| JP | 11-278240 A | 10/1999 |
| JP | 2000-103329 A | 4/2000 |
| JP | 2001063548 A * | 3/2001 |

OTHER PUBLICATIONS

Notice of Reasons for Rejection issued in JPO in corresponding Japanese Application No. 2004-214235 dated Nov. 17, 2009 with Partial English Translation.

* cited by examiner

*Primary Examiner* — Craig Schneider
*Assistant Examiner* — Andrew J Rost
(74) *Attorney, Agent, or Firm* — Buchanan Ingersoll & Rooney PC

(57) ABSTRACT

A reservoir tank for a vehicle brake system has a tank body including upper and lower shells joined together along mating surfaces. A float and a fluid level sensor are mounted in a fluid level detecting chamber defined in the tank body. The float is fitted on a shaft of the fluid level sensor. A partition plate is fitted in the lower shell to restrict a flow of hydraulic fluid into and out of the fluid level detecting chamber. The partition plate is disposed near the top end of the shaft of the fluid level sensor to restrict the distance by which the float can move vertically. A filter, the fluid level sensor and the partition plate are all set in the lower shell. The filter and the partition plate having their top ends pressed against the bottom ends of partitioning walls of the upper shell. Thus, the filter and the partition wall are held in position in the tank body between the upper and lower shells. No separate retainer for the float is necessary because the partition plate serves also as a float retainer.

5 Claims, 4 Drawing Sheets

RESERVOIR TANK FOR VEHICLE BRAKE SYSTEM

BACKGROUND OF THE INVENTION

The present invention relates to a reservoir tank mounted to a master cylinder or a hydraulic booster of a vehicle brake system.

A typical conventional reservoir tank 10 is shown in FIG. 6B, which comprises a tank body 1 comprising a lower shell 1a and an upper shell 1b, which are joined together by melting their mating surfaces with a hot plate H (FIG. 6A), putting the top shell 1b onto the lower shell 1a so that their molten mating surfaces contact each other, and allowing the mating surfaces to harden so as to be fixed to each other.

The reservoir tank 10 includes partition walls 2 that divide the interior of the tank body 1 into a plurality of chambers, thereby minimizing pulsation of hydraulic fluid F in the tank body, a filter 4 provided in one of the chambers through which hydraulic fluid F flows into and out of the reservoir tank, and a float 5 and a fluid level sensor 6 provided in a fluid level detecting chamber 3. The flow of hydraulic fluid F into and out of the fluid level detecting chamber 3 is restricted by a partition plate 7. The upper shell 1b has a fluid supply port 8. (This particular type of reservoir tank 10 is disclosed in JP patent publication 11-20660.)

The fluid level sensor has a shaft 6a which carries at its top end a retainer 9 that restricts the movement of the float 5 and also prevents separation of the float 5 from the fluid level sensor 6. The retainer 9 is e.g. a snap ring fixed to the shaft of the sensor 6 by caulking or bonding.

In order to mount the retainer 9 to the shaft of the sensor 6, it is necessary to increase the length of the shaft of the sensor 6, and thus the entire reservoir tank, which is undesirable in view of the fact that today's vehicles have an increasing number of parts in the engine room, so that it is required that each part in the engine room be as small in size as possible.

Also, the retainer 9 adds to the number of parts, the number of assembling steps and thus the manufacturing cost of the reservoir tank.

An object of the present invention is to provide a reservoir tank that needs no retainer.

SUMMARY OF THE INVENTION

According to the present invention, the partition plate which faces the float serves as a retainer for the float.

With this arrangement, since there is no need to provide a separate retainer for the float, it is possible to reduce the cost of the reservoir tank.

Specifically, the reservoir tank according to the present invention comprises a tank body including upper and lower shells joined together along mating surfaces thereof, the tank body defining a fluid level detecting chamber therein, a fluid level sensor mounted in the fluid level detecting chamber, a float vertically movably mounted in the fluid level detecting chamber, and a partition plate for restricting a flow of hydraulic fluid into and out of the fluid level detecting chamber, the partition plate being disposed so as to oppose the float, thereby restricting a distance by which the float is vertically movable in the fluid level detecting chamber.

Preferably, the float, the fluid level sensor and the partition plate are mounted in the lower shell, the fluid level sensor having a vertical shaft on which the float is vertically movably mounted, the partitioning wall being disposed near a top end of the vertical shaft.

From another aspect of the invention, there is provided a reservoir tank for use in a brake system comprising a tank body including upper and lower shells joined together along mating surfaces thereof, the tank body including partition walls which divide an interior of the tank body into a plurality of chambers including a fluid level detecting chamber, thereby preventing pulsation of hydraulic fluid in the tank body, a filter mounted in one of the plurality of chambers, a fluid level sensor mounted in the fluid level detecting chamber and having a vertical shaft, a float mounted in the fluid level detecting chamber so as to be vertically movable along the vertical shaft, the filter, the float and the fluid level sensor being mounted in the lower shell, and a partition plate fitted in the lower shell and restricting a flow of hydraulic fluid into and out of the fluid level detecting chamber, the partition plate being disposed near a top end of the vertical shaft, thereby restricting a distance by which the float is vertically movable along the vertical shaft, the upper shell having a port through which hydraulic fluid can be supplied into the tank body, the filter and the partition plate having top ends thereof pressed against a bottom end of at least one of the partition wall, whereby the filter and the partition wall are held in position in the tank body between the upper and lower shells.

By fitting the partition plate in the lower shell so as to restrict the movement of the float, the float will never separate when the upper and lower shells are joined together. By mounting all of the elements of the reservoir tank in the lower shell, it is possible to combine the lower shell with any of various different kinds of upper shells having e.g. different kinds of hydraulic fluid supply ports at different positions.

Preferably, the partition plate is provided with at least two downward protrusions formed on a bottom surface thereof, the downward protrusions being provided around a vertical axis along which the float is movable, and circumferentially separated from each other by gaps that are large enough such that hydraulic fluid can flow therethrough, the downward protrusions being configured to abut the protrusions, thereby restricting the distance. The float can smoothly abut the protrusions because hydraulic fluid between the float and the partition wall can be smoothly discharged through the gaps defined between the protrusions.

According to the present invention, since the vertical movement of the float is restricted by the partitioning wall, there is no need to provide a separate retainer for the float. Thus, it is possible to reduce the cost of the reservoir tank.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
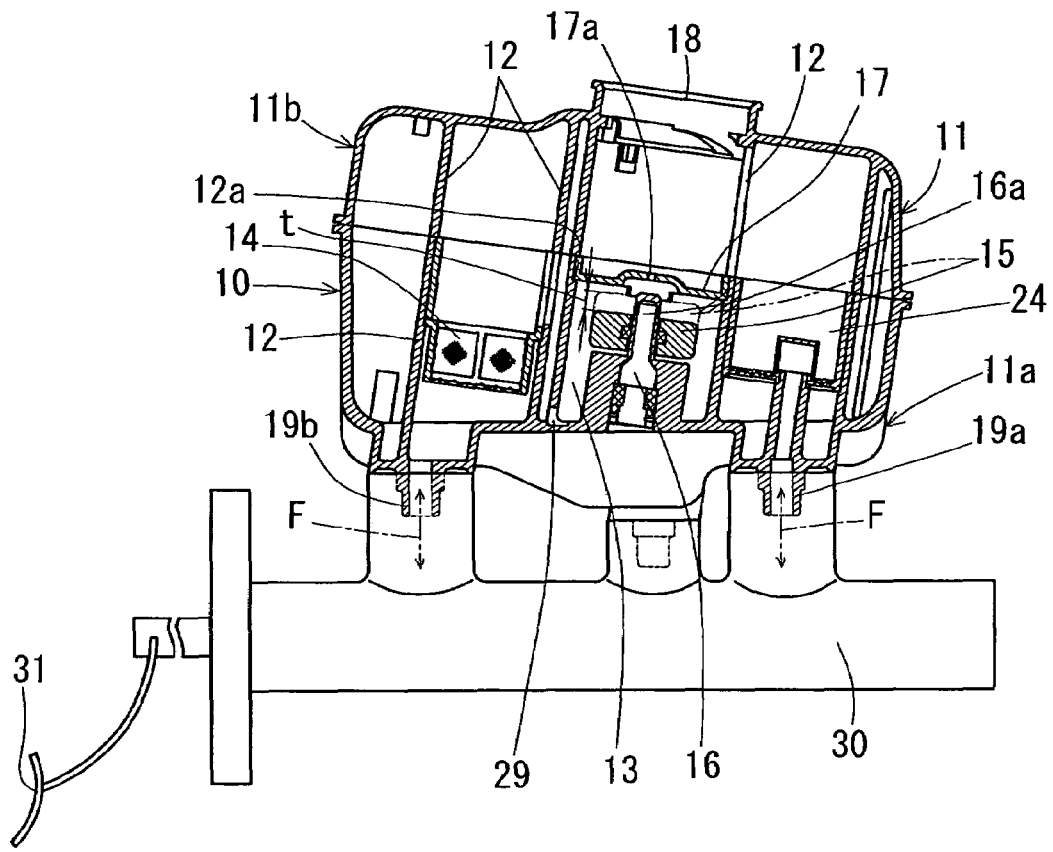
FIG. 1 is a partially cutaway front view of the reservoir tank embodying the present invention.
Figure 2:
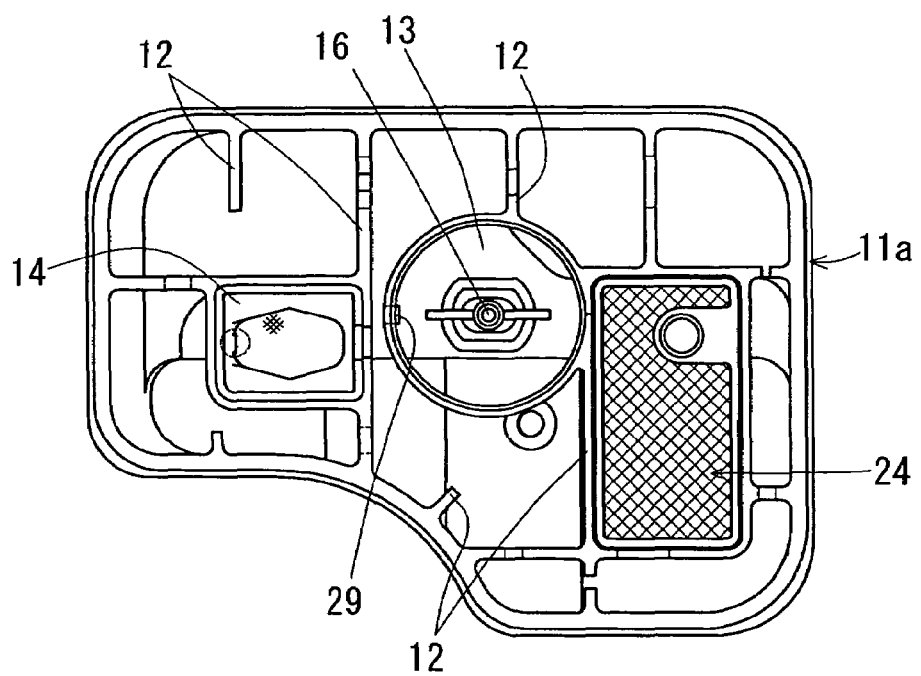
FIG. 2 is a plan view of the same with the upper shell omitted.
Figure 3:
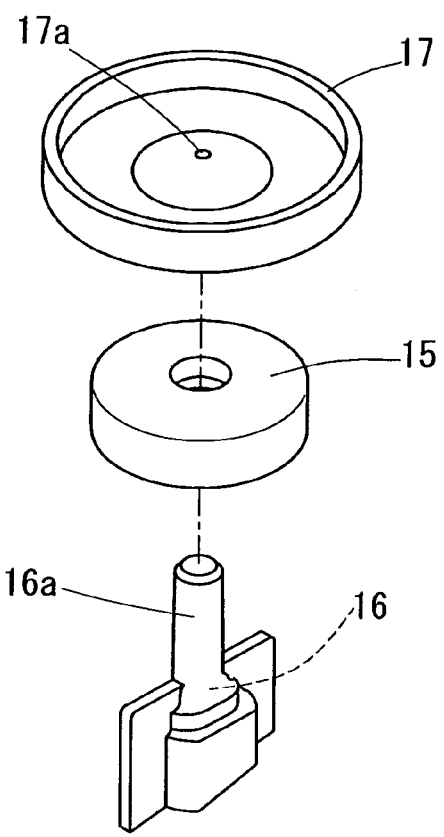
FIG. 3 is an exploded perspective view of the same, showing the fluid level sensor, float and partition plate.

Now referring to FIGS. 1-5, the reservoir tank 10 embodying the present invention is used in a vehicle brake system for controlling brake hydraulic pressure of the vehicle brakes. The reservoir tank 10 includes a tank body 11 comprising a lower shell 11a and an upper shell 11b, which are both formed of a synthetic resin, and mounted to a master cylinder 30. The interior of the tank body 11 is divided into a plurality of chambers including a fluid level detecting chamber 13 by partition walls 12 to minimize pulsation of hydraulic fluid F. (In FIGS. 1 to 5, the partition walls 12 are partially not shown.) The upper shell 11b has on its top a hydraulic fluid supply port 18 integral with the upper shell 11b through which hydraulic fluid F is supplied into the tank body 11. The lower shell 11a has a port 19a through which hydraulic fluid F flows between the master cylinder 30 and the reservoir tank 10, and a port 19b through which the hydraulic fluid F flows between the reservoir tank 10 and the master cylinder 30 and/or hydraulic units such as a pump. When hydraulic fluid flows into the reservoir tank through the port 19a or 19b, it passes through a filter 14 or 24 and any foreign objects such as small rubber pieces are removed.

A brake pedal 31 is coupled to the master cylinder 30. A cap, not shown, is put on the hydraulic fluid supply port 18. By removing the cap, hydraulic fluid F can be supplied into the tank body 11.

A fluid level sensor 16 is mounted in the hydraulic level detecting chamber 13 so as to be disposed in the lower shell 11a. The sensor 16 has a shaft 16a on which a float 15 is axially slidably mounted. According to the level of hydraulic fluid F in the tank body, the float 15 is movable by a distance t shown in FIG. 1 between the position shown by solid line in FIG. 1 and the position shown by the phantom line. The fluid level sensor 16 (see FIG. 3) senses the axial position of the float and thus the fluid level. The fluid level sensor 16 may be a proximity switch.

A partition plate 17 is provided at the top opening of the fluid level detecting chamber 13. The partition plate 17 is centrally formed with an aperture 17a. A hole 29 is formed in the lower portion of the fluid level detection chamber 13. Through the aperture 17a and the hole 29, hydraulic fluid F can flow in a restricted amount. With this arrangement, the fluid level in the fluid level detecting chamber 13 is less influenced by vibrations of the vehicle, so that the fluid level sensor 16 can detect the hydraulic fluid level in the reservoir tank 10 with high accuracy. The partition plate 17 is fixedly engaged in a cutout 12a formed in the inner surface of the partition wall 12 defining the fluid level detecting chamber 13.

Figure 4A:
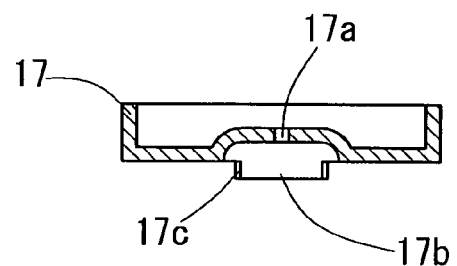
FIGS. 4A and 4B are a sectional front view and a bottom plan view of the partition plate, respectively.
Figure 4B:
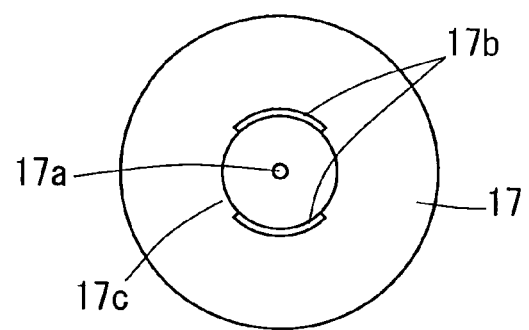

Part cylindrical protrusions 17b as shown in FIGS. 4A and 4B are provided on the bottom surface of the partition plate 17. The protrusions 17b have their centers of curvature disposed on the axis of the shaft 16a of the sensor 16 and thus on the axis of the float 15, and is arranged such that the float 15 abuts the bottoms of the part cylindrical protrusions 17b when the float 15 moves to the position shown by the phantom line in FIG. 1. The protrusions 17b thus prevent the float 15 from moving further upwardly from the position shown by phantom line in FIG. 1 and thus separating from the shaft 16a of the sensor 16. The protrusions 17b also serve to determine the distance t by which the float 15 is vertically movable relative to the shaft 16a. When the float 15 approaches the part cylindrical protrusions 17b, hydraulic fluid therebetween is smoothly discharged through the gaps 17c between the protrusions 17b. The gaps 17c are not limited in position and circumferential and vertical dimensions. But they are preferably sufficiently large so that hydraulic fluid can be smoothly discharged therethrough when the float 15 approaches the protrusions 17b irrespective of the attitude of the float (for example, even if the float is inclined in any direction).

In order to assemble the reservoir tank 10, the filters 14, 24, the fluid level sensor 16 and the float 15 are set in the lower shell 11a, and the partition plate 17 is fitted in the lower shell 11a.

Figure 5A:
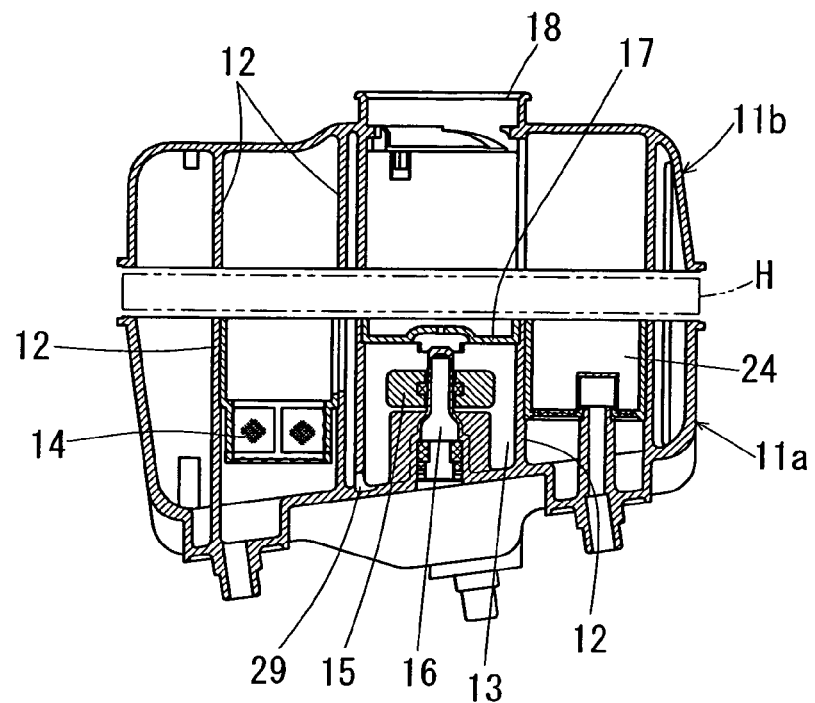
FIGS. 5A and 5B are sectional front views of the reservoir tank before and after assembly, respectively.
Figure 5B:
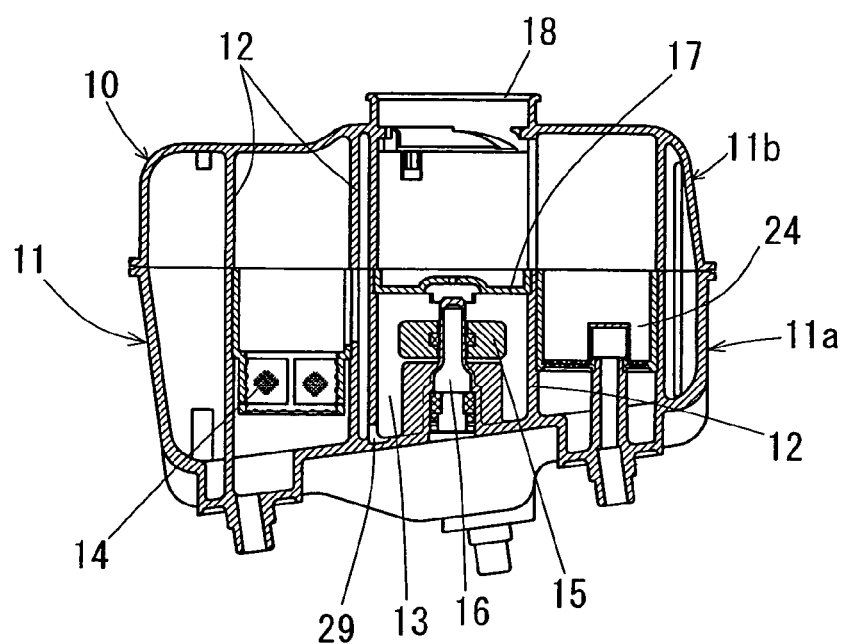
Figure 6A:
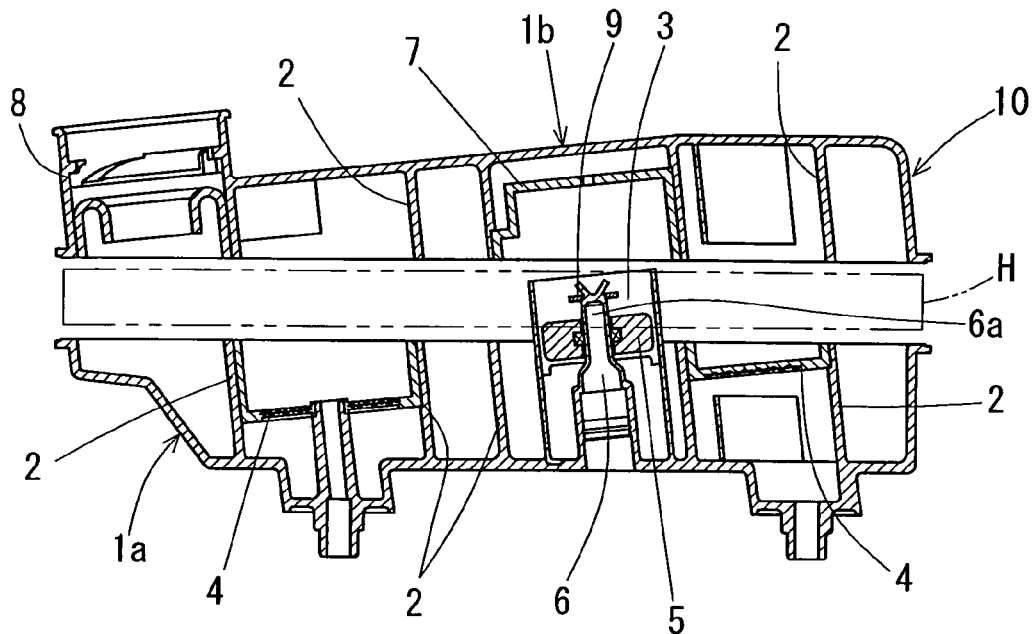
FIGS. 6A and 6B are sectional views of conventional reservoir tank before and after assembly, respectively.
Figure 6B:
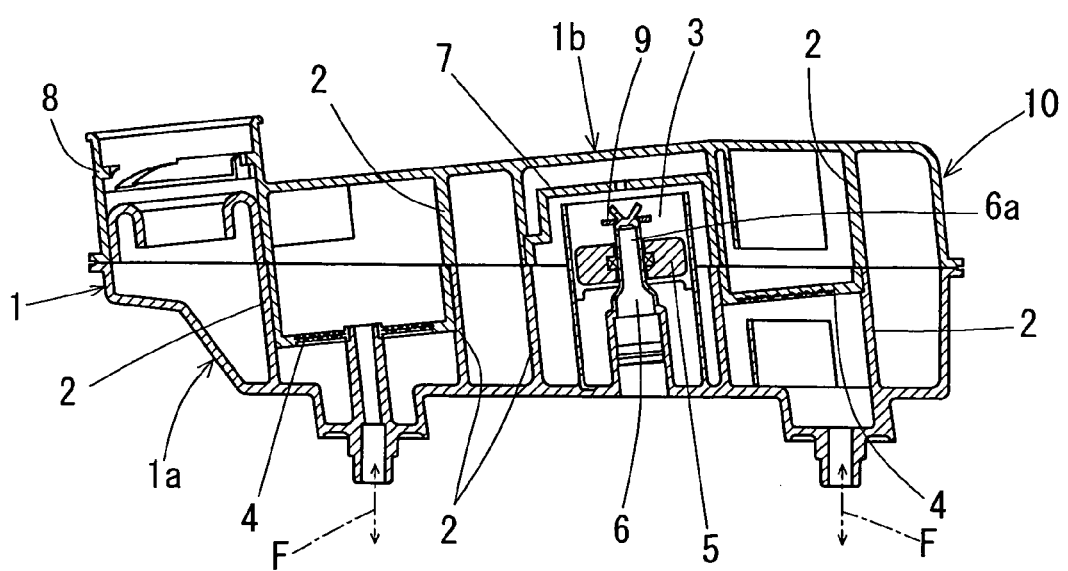

Then, as shown in FIG. 5A, a hot plate H is inserted between the upper and lower shells 11b and 11a to melt their mating surfaces. The molten mating surfaces are brought into abutment with each other and hardened to join the upper and lower shells 11b and 11a together. With the upper and lower shells joined together, the partition plate 17, which is fitted in the lower shell 11a, is disposed right over the top end of the shaft 16a of the fluid level sensor 16, thereby preventing the float 15 from coming off the shaft 16a.

When the mating surfaces of the upper and lower shells are melted by the hot plate H, the top ends of the filter 14 and the partition plate 17 are also melted by the hot plate. Thus, when the mating surfaces of the upper and lower shells are joined together, the top ends of the filter 14 and the partitioning plate 17 are also pressed against the bottom ends of partitioning walls 12 and joined thereto. Instead of melting and joining the upper and lower shells, the upper and lower shells may be joined together using an adhesive or by any other known means.

In the embodiment, the reservoir tank is mounted on the master cylinder 30. But the concept of the present invention is applicable to reservoir tanks of any other devices.

What is claimed is:
1. A reservoir tank for use in a brake system comprising:
a tank body including an upper shell having a bottom mating surface and a lower shell having a top mating surface, said upper and lower shells being joined together along said top and bottom mating surfaces;
said upper and lower shells including partition walls which divide an interior of said tank body into a plurality of chambers including a fluid level detecting chamber, thereby preventing pulsation of hydraulic fluid in said tank body, said fluid level detecting chamber being located in said lower shell;
a fluid level sensor mounted in said fluid level detecting chamber;
a float vertically movably mounted in said fluid level detecting chamber; and
a partition plate for restricting a flow of hydraulic fluid into and out of said fluid level detecting chamber;
said partition plate comprising a main body and an upwardly extending flange provided along and over the entire outer peripheral edge of the main body, and being in engagement, at a connecting portion of the partition plate where the flange is connected to the main body, with a shoulder formed on one of the partition walls of the lower shell defining said fluid level detecting chamber at its top end portion;
said partition plate being disposed so as to oppose said float, thereby restricting a distance by which said float is vertically movable in said fluid level detecting chamber;
wherein each of said float, said fluid level sensor and said partition plate is mounted in said lower shell so as to be entirely accommodated in said lower shell with no portions of said float, said fluid level sensor and said partition plate protruding upwardly from said top mating surface;
said fluid level sensor having a vertical shaft on which said float is vertically movably mounted;
said partition plate being disposed near a top end of said vertical shaft and being in engagement with said shoulder;

the float being axially slidable along the shaft between a first position in which, with the partition plate in engagement with said shoulder, the float abuts the partition plate and is prevented from further moving in a direction toward the top end of the shaft and a second position in which the float is more remote from the top end of the shaft than when the float is in the first position;

the shaft being free of any structure joined to the shaft that prevents separation of the float from the top end of the shaft;

wherein said top and bottom mating surfaces are joined together by melting, and a top end surface of said flange of said partition plate and a bottom end surface of one of the partition walls of the upper shell are joined together by melting; and wherein the main body of the partition plate has a top surface and a bottom surface, the bottom surface including an upwardly protruding substantially dome-shaped portion defining a substantially dome-shaped interior space, and an aperture is formed in the dome-shaped portion of the bottom surface at its highest point so as to extend through the main body of the partition plate to its top surface.

2. The reservoir tank of claim 1 wherein said partition plate includes at least two downward protrusions formed on a bottom surface thereof, said downward protrusions being provided around a vertical axis along which said float is movable, and circumferentially separated from each other by gaps that are large enough such that hydraulic fluid can flow therethrough, said downward protrusions being configured to abut said float.

3. A reservoir tank for use in a brake system comprising:
a tank body including upper and lower shells joined together along mating surfaces thereof;
said upper and lower shells including partition walls which divide an interior of said tank body into a plurality of chambers including a first chamber into which hydraulic fluid flows from outside the tank body and from which hydraulic fluid flows out of the tank body, and a fluid level detecting chamber, thereby preventing pulsation of hydraulic fluid in said tank body, said fluid level detecting chamber being located in said lower shell;
a filter mounted in said first chamber;
a fluid level sensor mounted in said fluid level detecting chamber and having a vertical shaft;
a float mounted in said fluid level detecting chamber so as to be vertically movable along said vertical shaft;
said filter, said float and said fluid level sensor being mounted in said lower shell, and
a partition plate for restricting a flow of hydraulic fluid into and out of said fluid level detecting chamber, said partition plate comprising a main body and an upwardly extending flange provided along and over the entire outer peripheral edge of the main body, and being in engagement, at a connecting portion of the partition plate where the flange is connected to the main body, with a shoulder formed on one of the partition walls of the lower shell defining said fluid level detecting chamber at its top end portion;
said partition plate being disposed near a top end of said vertical shaft, and being in engagement with said shoulder, thereby restricting a distance by which said float is vertically movable along said vertical shaft by abutting said float;
said upper shell having a port through which hydraulic fluid can be supplied into said tank body;

wherein said top and bottom mating surfaces are joined together by melting with said filter held in position in said tank body between said upper and lower shells, and wherein a top end surface of said flange of said partition plate and a bottom end surface of one of the partition walls of the upper shell are joined together by melting; and wherein the main body of the partition plate has a top surface and a bottom surface, the bottom surface including an upwardly protruding substantially dome-shaped portion defining a substantially dome-shaped interior space, and an aperture is formed in the dome-shaped portion of the bottom surface at its highest point so as to extend through the main body of the partition plate to its top surface.

4. The reservoir tank of claim 3 wherein said partition plate includes at least two downward protrusions formed on a bottom surface thereof, said downward protrusions being provided around a vertical axis along which said float is movable, and circumferentially separated from each other by gaps that are large enough such that hydraulic fluid can flow therethrough, said downward protrusions being configured to abut said float.

5. A reservoir tank for use in a brake system comprising a tank body including upper and lower shells joined together along mating surfaces;
said upper and lower shells including partition walls which divide an interior of said tank body into a plurality of chambers including a fluid level detecting chamber, thereby preventing pulsation of hydraulic fluid in said tank body, said fluid level detecting chamber being located in said lower shell;
a fluid level sensor mounted in said fluid level detecting chamber;
a float vertically movably mounted in said fluid level detecting chamber; and
a partition plate for restricting a flow of hydraulic fluid into and out of said fluid level detecting chamber;
said partition plate comprising a main body and an upwardly extending flange provided along and over the entire outer peripheral edge of the main body, and being in engagement, at a connecting portion of the partition plate where the flange is connected to the main body, with a shoulder formed on one of the partition walls of the lower shell defining said fluid level detecting chamber at its top end portion;
said partition plate being disposed in engagement with said shoulder so as to oppose said float, thereby restricting a distance by which said float is vertically movable in said fluid level detecting chamber by abutting said partition plate;
wherein said mating surfaces of the upper and lower shells are joined together by melting, and a top end surface of said flange of said partition plate and a bottom end surface of one of the partition walls of the upper shell are joined together by melting; and
wherein the main body of the partition plate has a top surface and a bottom surface, the bottom surface including an upwardly protruding substantially dome-shaped portion defining a substantially dome-shaped interior space, and an aperture is formed in the dome-shaped portion of the bottom surface at its highest point so as to extend through the main body of the partition plate to its top surface.

* * * * *